US012599932B2

(12) United States Patent
Terasawa et al.

(10) Patent No.: US 12,599,932 B2

(45) Date of Patent: Apr. 14, 2026

(54) DRIVE CONTROL DEVICE AND ULTRASONIC MOTOR SYSTEM

(71) Applicant: Murata Manufacturing Co., Ltd., Nagaokakyo (JP)

(72) Inventors: Mitsushiro Terasawa, Nagaokakyo (JP); Yuzo Mizushima, Nagaokakyo (JP); Takahito Kushima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 855 days.

(21) Appl. No.: 17/964,278

(22) Filed: Oct. 12, 2022

(65) Prior Publication Data

US 2023/0042796 A1 Feb. 9, 2023

Related U.S. Application Data

(63) Continuation of application No. PCT/JP2021/009528, filed on Mar. 10, 2021.

(30) Foreign Application Priority Data

Jun. 2, 2020 (JP) ................................. 2020-096229

(51) Int. Cl.
*B06B 1/02* (2006.01)
*B06B 1/06* (2006.01)

(52) U.S. Cl.
CPC .............. *B06B 1/0207* (2013.01); *B06B 1/06* (2013.01)

(58) Field of Classification Search
CPC ....... B06B 1/0207; B06B 1/06; B06B 1/0625; B06B 2201/20; B06B 2201/55; H02N 2/14; H02N 2/16
See application file for complete search history.

(56) References Cited

U.S. PATENT DOCUMENTS 4,952,834 A * 8/1990 Okada .................... H02N 2/147 310/316.02
5,365,139 A * 11/1994 Kasuga .................... H02N 2/14 318/116

(Continued)

FOREIGN PATENT DOCUMENTS

EP 2579444 A1 * 4/2013 ............ H02N 2/142
JP H06062588 A 3/1994

(Continued)

OTHER PUBLICATIONS

International Search Report in PCT/JP2021/009528, mailed May 18, 2021, 3 pages.

*Primary Examiner* — Pedro J Cuevas

(74) *Attorney, Agent, or Firm* — ArentFox Schiff LLP

(57) ABSTRACT

A drive control device is provided that vibrates a vibrating body by applying signals having mutually different phases to a plurality of electrodes provided at a piezoelectric element on the vibrating body. The drive control device includes a signal application unit that selectively applies a signal to an electrode of the plurality of electrodes; an amplitude detection unit that receives a feedback signal from an electrode different from the electrode to which the signal application unit has performed selective application; and a signal condition control unit that controls a condition of a signal to be applied by the signal application unit based on the feedback signal.

18 Claims, 7 Drawing Sheets

(56) References Cited

U.S. PATENT DOCUMENTS

| | | | | | |
|---|---|---|---|---|---|
| 5,416,374 | A * | 5/1995 | Inoue | H02N 2/166 318/116 |
| 5,592,041 | A * | 1/1997 | Kasuga | H02N 2/145 310/316.02 |
| 6,083,191 | A * | 7/2000 | Rose | A61B 17/320068 606/169 |
| 6,288,475 | B1 * | 9/2001 | Ito | H02N 2/163 310/323.03 |
| 7,298,066 | B2 * | 11/2007 | Kawaguchi | H02N 2/142 310/316.02 |
| 7,459,830 | B2 * | 12/2008 | Hashimoto | G04C 17/0058 310/369 |
| 7,545,076 | B1 * | 6/2009 | Hills | H02N 2/026 310/317 |
| 7,675,218 | B2 * | 3/2010 | Kawaguchi | G04C 3/12 310/317 |
| 8,922,096 | B2 * | 12/2014 | Beck | H02N 2/062 310/332 |
| 9,087,976 | B2 * | 7/2015 | Kugo | H10N 30/802 |
| 9,221,171 | B2 * | 12/2015 | Sugiura | B25J 13/082 |
| 10,593,864 | B2 * | 3/2020 | Furuta | H10N 30/04 |
| 11,258,376 | B2 * | 2/2022 | Furuta | H10N 30/8536 |
| 12,246,346 | B2 * | 3/2025 | Terasawa | H02N 2/16 |
| 12,366,922 | B2 * | 7/2025 | Huang | G06F 3/016 |
| 2006/0113863 | A1 * | 6/2006 | Kawaguchi | H02N 2/103 310/314 |
| 2007/0194660 | A1 * | 8/2007 | Hashimoto | H02N 2/103 310/316.01 |
| 2007/0278976 | A1 * | 12/2007 | Kawaguchi | H02N 2/062 318/116 |
| 2012/0126157 | A1 * | 5/2012 | Beck | H02N 2/062 251/129.05 |
| 2013/0069563 | A1 * | 3/2013 | Kugo | H02N 2/142 318/116 |
| 2014/0214209 | A1 * | 7/2014 | Sugiura | B25J 9/1612 310/322 |
| 2019/0140558 | A1 * | 5/2019 | Furuta | H02N 2/0075 |
| 2020/0324225 | A1 * | 10/2020 | Lipkens | B06B 1/06 |
| 2023/0130784 | A1 * | 4/2023 | Terasawa | B06B 1/0215 318/114 |
| 2024/0160391 | A1 * | 5/2024 | Hasegawa | G06F 3/1234 |
| 2024/0353929 | A1 * | 10/2024 | Huang | G06F 3/0416 |
| 2025/0118176 | A1 * | 4/2025 | Chen | G08B 6/00 |
| 2025/0242585 | A1 * | 7/2025 | Okui | B41J 29/393 |

FOREIGN PATENT DOCUMENTS

| | | | | |
|---|---|---|---|---|
| JP | H07123757 | A | 5/1995 | |
| JP | H09285150 | A | 10/1997 | |
| JP | 2683237 | B2 | 11/1997 | |
| JP | H10285963 | A | 10/1998 | |
| JP | 2000224875 | A | 8/2000 | |
| WO | WO-2011152191 | A1 * | 12/2011 | H02N 2/142 |
| WO | WO-2022102673 | A1 * | 5/2022 | H10N 30/20 |

* cited by examiner

STANDING WAVE X

STANDING WAVE Y

TRAVELING WAVE

DRIVE CONTROL DEVICE AND ULTRASONIC MOTOR SYSTEM

CROSS REFERENCE TO RELATED APPLICATIONS

This application is a continuation of PCT Application No. PCT/JP2021/009528, filed Mar. 10, 2021, which claims priority to Japanese Patent Application No. 2020-096229, filed Jun. 2, 2020, the entire contents of each of which are hereby incorporated by reference in their entirety.

TECHNICAL FIELD

The present invention relates to a drive control device that drives a driver having a piezoelectric element, and an ultrasonic motor system having a piezoelectric element.

BACKGROUND

Conventionally, various ultrasonic motors each vibrating a stator by a piezoelectric element have been proposed. For example, an ultrasonic motor includes a stator including a piezoelectric element(s) polarized in a plurality of manners, and a rotor in contact with the stator. Signals having mutually different phases are applied to the piezoelectric element(s) polarized in a plurality of manners, so that the stator vibrates. The vibrations cause the rotor to rotate.

Moreover, an optimum frequency of each signal applied to the piezoelectric element(s) varies depending on the contact pressure between the stator and the rotor, the temperature of the ultrasonic motor, and the load applied to the ultrasonic motor. Therefore, appropriate feedback control on the frequency of the above signals enables the ultrasonic motor to be efficiently driven.

In an ultrasonic motor described in Japanese Patent No. 2683237 (hereinafter "Patent Document 1") described below, a piezoelectric element and a feedback piezoelectric element are attached to an elastic body. A feedback signal is output from the feedback piezoelectric element in response to vibrations of the elastic body. Based on the feedback signal, a drive voltage signal to be applied to the piezoelectric element is controlled.

In the ultrasonic motor described in Patent Document 1, the feedback piezoelectric element is required to be disposed on the elastic body. It is therefore difficult to reduce the number of components and downsize the ultrasonic motor based on this configuration.

SUMMARY OF THE INVENTION

Accordingly, it is an object of the present invention to provide a drive control device and an ultrasonic motor system using the same, configured for easily downsizing an ultrasonic motor element.

In an exemplary aspect, a drive control device is provided that vibrates a vibrating body by applying signals having mutually different phases to a plurality of electrodes provided at a piezoelectric element on the vibrating body. In particular, the drive control device includes a signal application unit that selectively applies a signal to an electrode of the plurality of electrodes; a feedback signal reception unit that receives a feedback signal from an electrode different from the electrode to which the signal application unit has performed selective application; and a signal condition control unit that controls a condition of a signal to be applied by the signal application unit, based on the feedback signal.

Moreover, an ultrasonic motor system is provided that includes the drive control device, the vibrating body, and the plurality of electrodes provided at the piezoelectric element on the vibrating body. In this aspect, the ultrasonic motor system does not include any feedback electrode.

According to the drive control device of the exemplary aspect of the present invention, downsizing of the ultrasonic motor element can be easily achieved. Moreover, according to the ultrasonic motor system of the exemplary aspect of the present invention, downsizing can be easily achieved.

DETAILED DESCRIPTION

Hereinafter, exemplary aspects of the present invention will be described using specific embodiments and with reference to the drawings.

It is to be noted that each of the embodiments described in the present specification is exemplary, and partial replacement or combination of configurations is possible among different embodiments as would be appreciated to one skilled in the art.

Figure 1:
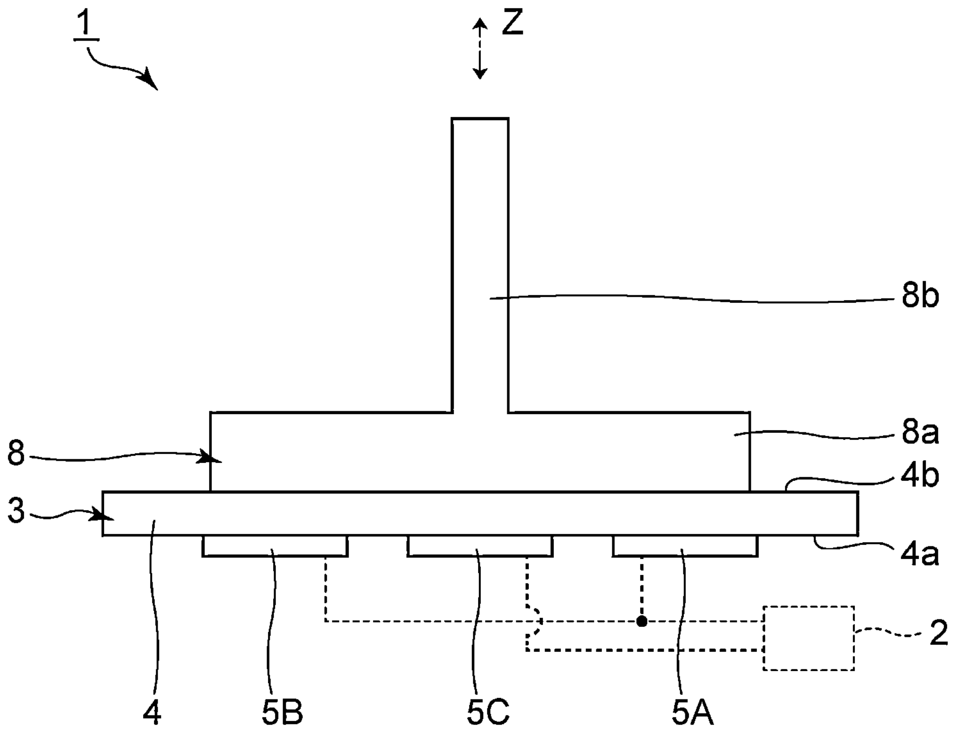
FIG. 1 is a connection relationship diagram of an ultrasonic motor element and a drive control circuit thereof in a first exemplary embodiment.

FIG. 1 is a connection relationship diagram of an ultrasonic motor element and a drive control circuit thereof in a first exemplary embodiment.

As shown, an ultrasonic motor system 1 has a drive control device 2 and an ultrasonic motor element. The ultrasonic motor element includes a stator 3 and a rotor 8. In the ultrasonic motor system 1, a driving signal is applied from the drive control device 2 to the stator 3. The stator 3 is thereby vibrated, so that a traveling wave circling around an axial direction Z is generated. Here, the stator 3 and the rotor 8 are in contact with each other. The traveling wave generated at the stator 3 causes the rotor 8 to rotate. Hereinafter, a specific configuration of the ultrasonic motor system 1 will be described.

As illustrated in FIG. 1, the stator 3 has a vibrating body 4. The vibrating body 4 has a disk shape and has a first main surface 4*a* and a second main surface 4*b*. The first main surface 4*a* and the second main surface 4*b* face each other (i.e., oppose each other). In the present specification, the axial direction Z is a direction along which the first main surface 4*a* and the second main surface 4*b* are linked, and is a direction along the rotation center. It is noted that the shape of the vibrating body 4 is not limited to a disk shape. The shape of the vibrating body 4 viewed from the axial direction Z may be, for example, a regular polygon such as a regular hexagon, a regular octagon, or a regular decagon, for example. The vibrating body 4 is made of an appropriate metal. However, the vibrating body 4 is not necessarily made of metal in alternative aspects. For example, the vibrating body 4 can be configured with another elastic body such as, for example, ceramics, a silicon material, or a synthetic resin.

Here, a piezoelectric element(s) shown in the following embodiments is(are) polarized in a plurality of manners. An example of the piezoelectric element(s) polarized in a plurality of manners includes one piezoelectric element having different polarization directions for different regions. An alternative example of the piezoelectric element(s) polarized in a plurality of manners includes a plurality of piezoelectric elements having mutually different polarization directions. The first exemplary embodiment will be shown as a case where the piezoelectric element(s) polarized in a plurality of manners is a plurality of piezoelectric elements.

At the first main surface 4*a* of the vibrating body 4, piezoelectric elements polarized in a plurality of manners are provided. More specifically, a plurality of piezoelectric elements having mutually different polarization directions are provided. The second main surface 4*b* is in contact with the rotor 8. The rotor 8 has a rotor body 8*a* and a rotating shaft 8*b*. The rotor body 8*a* has a disk shape. One end of the rotating shaft 8*b* is coupled to the rotor body 8*a*. Moreover, the rotor body 8*a* is in contact with the second main surface 4*b* of the vibrating body 4. Note that the shape of the rotor body 8*a* is not limited to a disk shape in alternative aspects. For example, the shape of the rotor body 8*a* viewed from the axial direction Z (e.g., in a plan view) can be, for example, a regular polygon such as a regular hexagon, a regular octagon, or a regular decagon.

In operation, a signal is applied from the drive control device 2 to the piezoelectric elements polarized in a plurality of manners. The vibrating body 4 of the stator 3 thereby vibrates in response to the signal. It is noted that the drive control device 2 receives a feedback signal from the stator 3. Based on the feedback signal, the drive control device 2 controls vibrations of the stator 3 and the rotational speed of the ultrasonic motor element.

Figure 2:
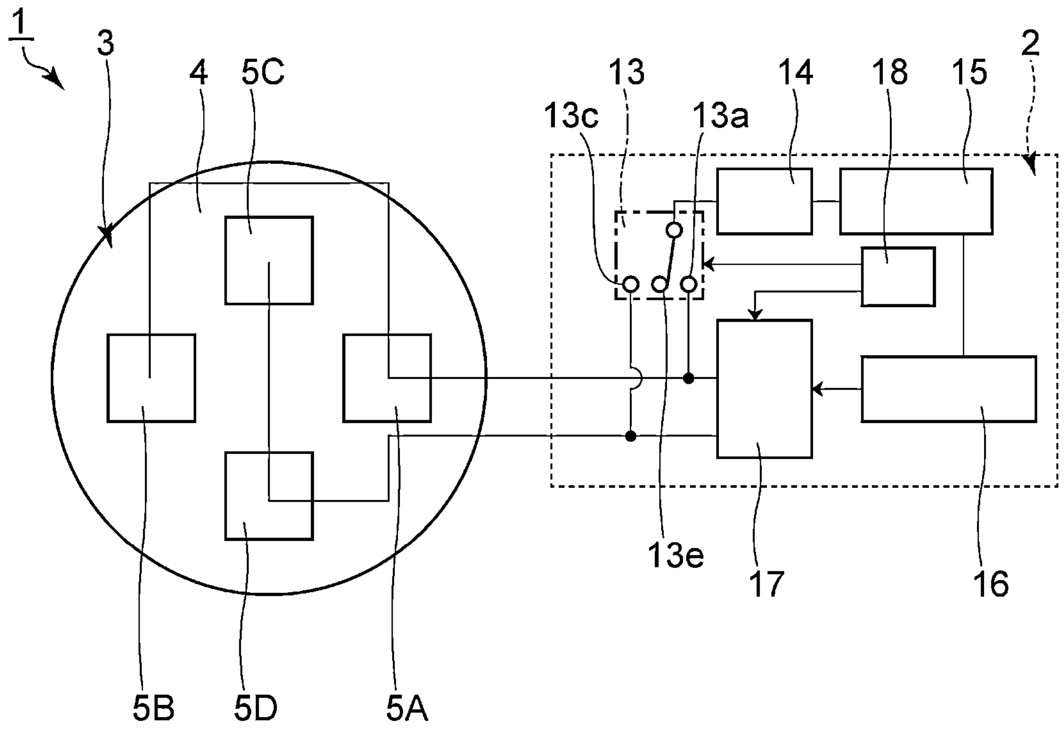
FIG. 2 is a schematic control circuit diagram of an ultrasonic motor system according to the first exemplary embodiment.

FIG. 2 is a schematic control circuit diagram of the ultrasonic motor system according to the first exemplary embodiment.

As shown, the drive control device 2 has a switch 13, a filter unit 14, an amplitude detection unit 15, a signal condition control unit 16, a signal application unit 17, and a switching control unit 18. The filter unit 14, the amplitude detection unit 15, and the signal condition control unit 16 are connected in this order between the switch 13 and the signal application unit 17. Each of the piezoelectric elements polarized in a plurality of manners is provided with a plurality of electrodes. The switch 13 selects an electrode to connect among the plurality of electrodes to thereby select a feedback signal to receive. The filter unit 14 filters the feedback signal. The amplitude detection unit 15 detects the amplitude of the vibrating body 4 from a feedback voltage. It is noted that the amplitude detection unit 15 is a "feedback signal reception unit" according to the present disclosure. The signal condition control unit 16 sets the frequency of a signal to be applied to each electrode of the piezoelectric elements, based on the detected amplitude of the vibrating body 4 and the like. The signal application unit 17 applies a signal to the plurality of electrodes. In addition, a signal can be selectively applied to an electrode of the plurality of electrodes. More specifically, the signal application unit 17 transmits, to a selected electrode among the plurality of electrodes provided at the piezoelectric elements polarized in a plurality of manners, a signal that vibrates a piezoelectric element. It is also noted that the switching control unit 18 controls selection by the switch 13 as to which electrode of the piezoelectric elements to connect and selection by the signal application unit 17 as to which piezoelectric element to vibrate.

According to the exemplary aspect, the filter unit 14, the amplitude detection unit 15, the signal condition control unit 16, the signal application unit 17, and the switching control unit 18 are described in a conceptually separated manner in order to describe their respective functions. However, these components are not required to be physically separated from one another in an exemplary aspect. For example, the amplitude detection unit 15, the signal condition control unit 16, the signal application unit 17, and the switching control unit 18 may be included in the same microcomputer, which can include software instructions stored in memory that can be executed by a processor (e.g., CPU) thereof to perform he functions described herein according to an exemplary aspect. In addition, it is noted that the filter unit 14 is not limited to one configured by a filter circuit component, and may also be configured with a digital filter in a microcomputer, similarly to the amplitude detection unit 15 and the like.

According to the exemplary embodiment, the ultrasonic motor system 1 has a plurality of electrodes provided at each piezoelectric element on the vibrating body 4, and the drive control device 2, and has no feedback electrode. Furthermore, according to the exemplary embodiment, the drive control device 2 has the switch 13, the signal application unit 17, and the amplitude detection unit 15, and that the switch 13 configured to perform switching such that an electrode different from the electrode to which the signal application unit 17 has performed selective application is connected to the amplitude detection unit 15. Since the ultrasonic motor system 1 has the drive control device 2, the ultrasonic motor system 1 eliminates the need for a feedback piezoelectric element and an electrode thereof. As a result, downsizing of the ultrasonic motor element can be achieved easily. The details thereof will be described below together with details of the configuration of the present embodiment.

Figure 3:
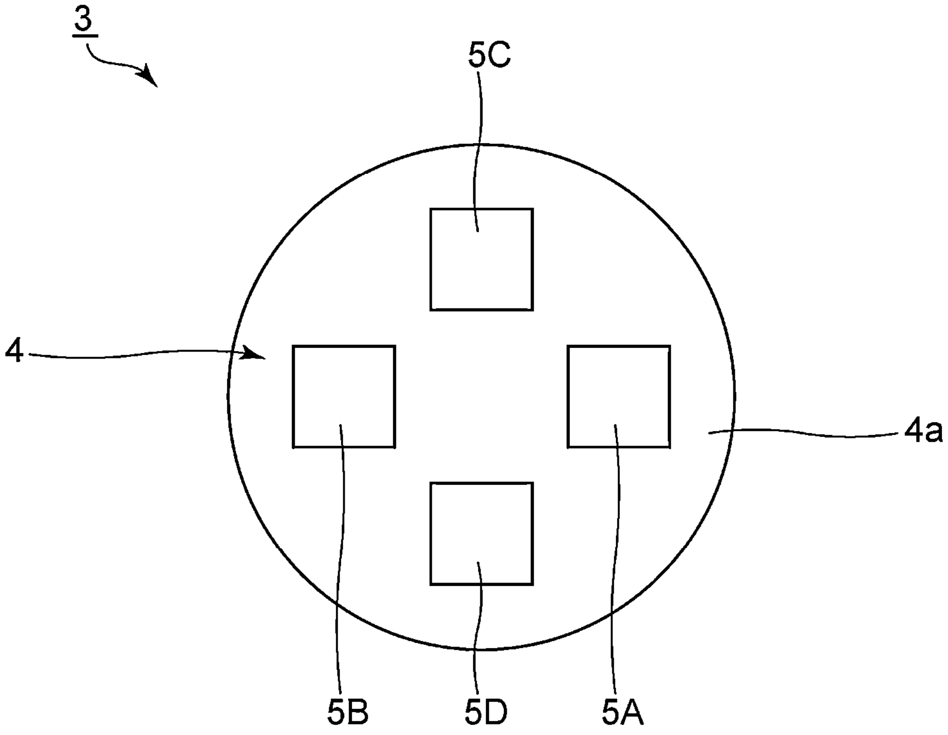
FIG. 3 is a bottom view of a stator in the first exemplary embodiment.

FIG. 3 is a bottom view of the stator in the first exemplary embodiment.

In the present embodiment, the piezoelectric elements polarized in a plurality of manners are a first piezoelectric element 5A, a second piezoelectric element 5B, a third piezoelectric element 5C, and a fourth piezoelectric element 5D. The plurality of piezoelectric elements are attached to the vibrating body 4 with an adhesive. An example of the adhesive that can be used is an epoxy resin, a polyethylene resin, or the like.

To generate a traveling wave circling around an axis parallel to the axial direction Z, the piezoelectric elements polarized in a plurality of manners are distributed along a circling direction of the traveling wave. When viewed from the axial direction Z, the first piezoelectric element 5A and the second piezoelectric element 5B face each other with the axis interposed therebetween. Likewise, the third piezoelectric element 5C and the fourth piezoelectric element 5D face each other with the axis interposed therebetween.

Figure 4:
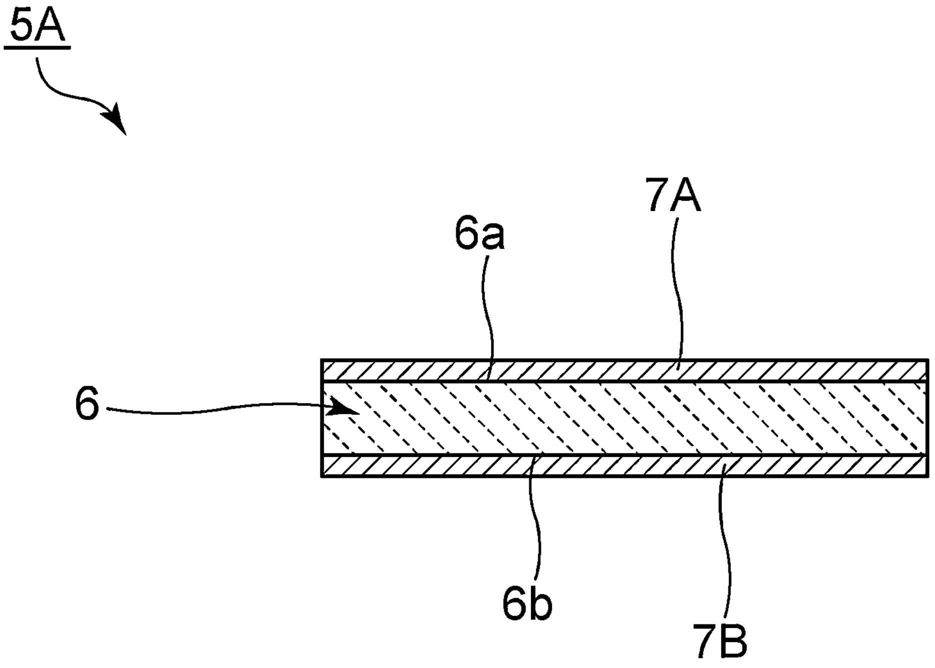
FIG. 4 is a front sectional view of a first piezoelectric element in the first exemplary embodiment.

FIG. 4 is a front sectional view of the first piezoelectric element in the first exemplary embodiment.

The first piezoelectric element 5A has a piezoelectric body 6 that has a third main surface 6*a* and a fourth main surface 6*b*. The third main surface 6*a* and the fourth main surface 6*b* face each other (i.e., oppose each other). The first piezoelectric element 5A has a first electrode 7A and a second electrode 7B. The piezoelectric body 6 is polarized from the third main surface 6*a* toward the fourth main surface 6*b*. The first electrode 7A is provided at the third main surface 6*a* of the piezoelectric body 6 and the second electrode 7B is provided at the fourth main surface 6*b* of the piezoelectric body 6.

Likewise, the second piezoelectric element 5B, the third piezoelectric element 5C, and the fourth piezoelectric element 5D are configured similarly to the first piezoelectric element 5A. However, the piezoelectric body 6 in the first piezoelectric element 5A and the piezoelectric body 6 in the second piezoelectric element 5B are polarized in mutually opposite directions. Thus, when the same signal is applied to the first piezoelectric element 5A and the second piezoelectric element 5B, they vibrate in mutually opposite phases. Similarly, the piezoelectric body 6 in the third piezoelectric element 5C and the piezoelectric body 6 in the fourth piezoelectric element 5D are also polarized in mutually opposite directions. In other words, the plurality of piezoelectric elements, i.e., the first, second, third, and fourth piezoelectric elements 5A, 5B, 5C, and 5D, are the piezoelectric elements polarized in a plurality of configurations.

The piezoelectric elements polarized in a plurality of configurations are electrically connected to the drive control device 2 described above. The drive control device 2 is configured to vibrate the piezoelectric elements polarized in mutually different phases in a plurality of manners. Here, one of the mutually different phases is denoted as an A phase, and the other is denoted as a B phase. According to the exemplary aspect, The phase difference between the A phase and the B phase in the present embodiment is 90°. Furthermore, the A phase includes phases mutually different by 180°, one of them is denoted as an A phase + and the other is denoted as an A phase −. Similarly, the B phase includes phases mutually different by 180°, one of them is denoted as a B phase + and the other is denoted as a B phase −. It is also noted that, although the embodiments below show examples of control in two phases including an A phase and a B phase, the technology of the exemplary embodiments of the present invention is also applicable to a case of control in three phases including an A phase, a B phase, and a C phase.

As illustrated in FIG. 2, the same signal is applied from the drive control device 2 to the first piezoelectric element 5A and the second piezoelectric element 5B. In the present embodiment, the first piezoelectric element 5A vibrates in the A phase +, and the second piezoelectric element 5B vibrates in the A phase −. Note that different signals are applied to the first piezoelectric element 5A and the third piezoelectric element 5C. The same signal is applied to the third piezoelectric element 5C and the fourth piezoelectric element 5D. As such, the third piezoelectric element 5C vibrates in the B phase +, and the fourth piezoelectric element 5D vibrates in the B phase −. Hereinafter, a piezoelectric element vibrating in the A phase may be described as an A-phase piezoelectric element. Similarly, a piezoelectric element vibrating in the B phase may be described as a B-phase piezoelectric element.

It is noted that a signal is applied from the drive control device 2 to the first electrodes of the piezoelectric elements. Thus, the plurality of first electrodes of the piezoelectric elements include an A-phase electrode to which an A-phase signal is applied and a B-phase electrode to which a B-phase signal is applied. The first electrode of each of the A-phase piezoelectric elements is an A-phase electrode, and the first electrode of each of the B-phase piezoelectric elements is a B-phase electrode. However, the second electrode of each of the piezoelectric elements may be an A-phase electrode or a B-phase electrode. The drive control device 2 vibrates the stator 3 according to the flow illustrated in FIG. 5.

Figure 5:
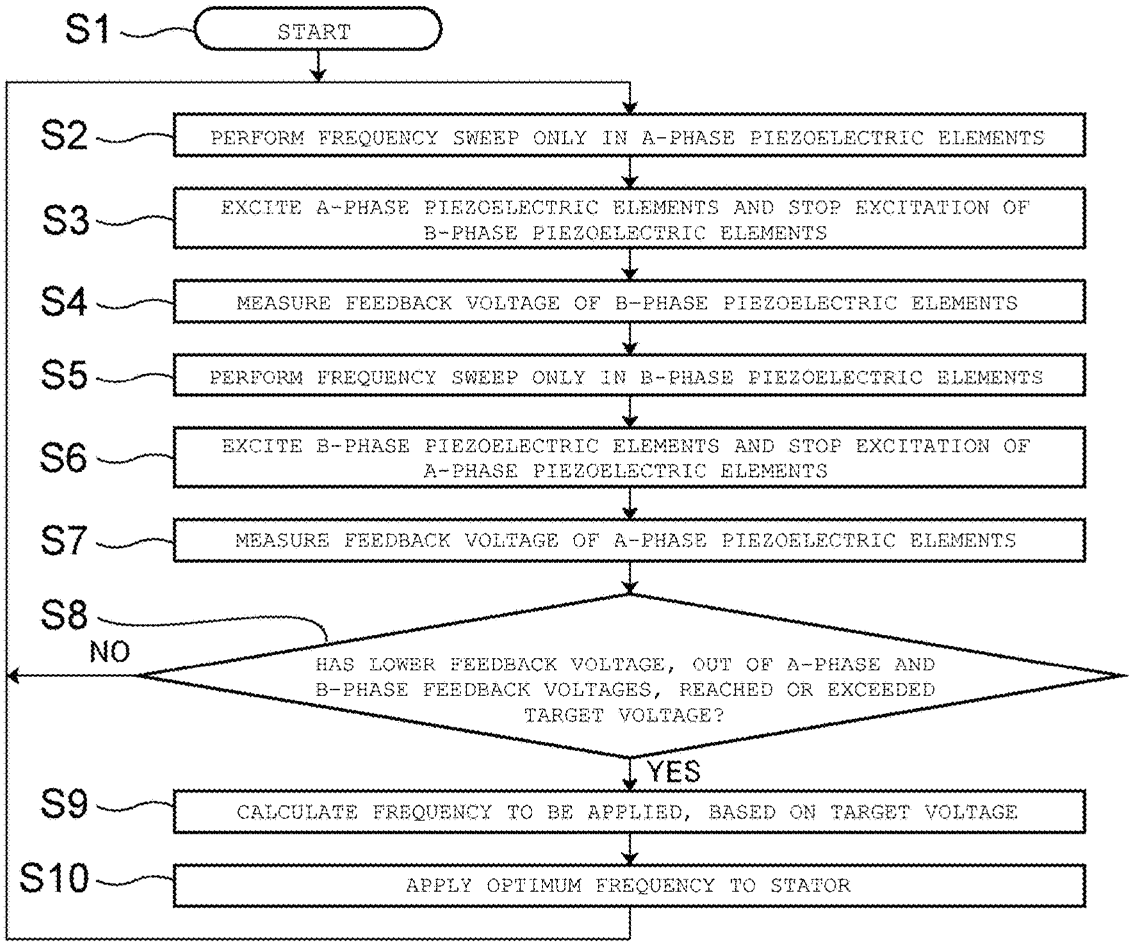
FIG. 5 is a flowchart illustrating an operation procedure of a drive control device in the first exemplary embodiment.
Figure 6:
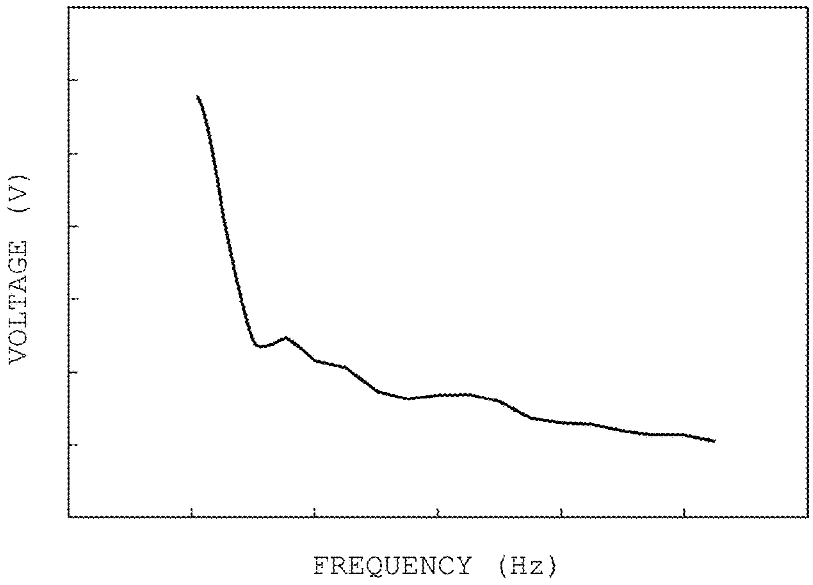
FIG. 6 is a diagram illustrating an example of a relationship between a frequency and a feedback voltage.

FIG. 5 is a flowchart illustrating an operation procedure of the drive control device in the first embodiment. FIG. 6 is a diagram illustrating an example of a relationship between a frequency and a feedback voltage. Note that the feedback voltage is the voltage of the feedback signal.

As illustrated in FIG. 5, the operation is started in step S1. In step S2, frequency sweep is performed only in the A-phase piezoelectric elements. At this time, the switching control unit 18 controls the signal application unit 17, so that a signal is transmitted from the signal application unit 17 only to the A-phase piezoelectric elements. Furthermore, the switching control unit 18 controls the switch 13, so that the switch 13 is connected only to the electrodes of the B-phase piezoelectric elements. The switching control unit 18 thus controls the switch 13 and the signal application unit 17 such that the piezoelectric elements selected by the switch 13 are different from the piezoelectric elements vibrated by the signal application unit 17, among the plurality of piezoelectric elements. Accordingly, when the frequency sweep is performed in the A-phase piezoelectric elements, a feedback signal from the B-phase piezoelectric elements is received. The feedback signal is filtered by the filter unit 14 as described above. A feedback voltage of the B-phase piezoelectric elements, which is responsive to the frequency of the signal applied to the A-phase piezoelectric elements, is measured. The relationship between the frequency and the feedback voltage as illustrated in FIG. 6 is thereby derived. Note that the amplitude of the vibrating body 4 is also detected by the amplitude detection unit 15 from the feedback voltage that has passed through the filter unit 14. From these relationships and a target voltage, the signal condition control unit 16 computes an optimum frequency of a signal to be transmitted to the A-phase piezoelectric elements.

Note that the target voltage is specifically a target voltage for the feedback voltage. Moreover, the target voltage can be stored in the signal condition control unit 16 in the exemplary aspect. The target voltage may be determined according to, for example, a required displacement of the vibrating body 4, a required rotational speed of the ultrasonic motor element, or the like, according to the application of the ultrasonic motor element. Similarly, the optimum frequency may also be determined according to a required displacement of the vibrating body 4, a required rotational speed of the ultrasonic motor element, or the like, based on the relationship as illustrated in FIG. 6 and the target voltage.

In step S3, the A-phase piezoelectric elements are excited and excitation of the B-phase piezoelectric elements is stopped. In step S3, as in step S2, the switching control unit 18 controls the signal application unit 17. More specifically, a signal is transmitted from the signal application unit 17 only to the A-phase piezoelectric elements. At this time, the signal application unit 17 selects an A-phase vibration condition from A-phase and B-phase vibration conditions, and applies a signal to the A-phase electrodes of the A-phase piezoelectric elements. Note that the frequency of the signal is set in the signal condition control unit 16. The signal condition control unit 16 controls the frequency at which the signal application unit 17 vibrates each piezoelectric element.

When the signal application unit 17 selects a phase condition, in other words, the A-phase or the B-phase, the selection may be performed under the control of the signal condition control unit 16. However, it is noted that the selection of the phase condition is not limited thereto, and can be performed under the control of the signal application unit 17 itself. In this case, the signal application unit 17 can include a control unit for selecting a phase. In an exemplary aspect, the signal application unit 17 can be programmed to determine which phase to apply from the A phase and the B phase according to the electrodes of the piezoelectric elements to which a signal is applied.

In step S4, a feedback voltage of the B-phase piezoelectric elements is measured. In step S4, as in step S2, the switching control unit 18 controls the switch 13. More specifically, the switch 13 is connected only to the B-phase electrodes of the B-phase piezoelectric elements. Only the B-phase electrodes are thereby connected to the amplitude detection unit 15.

In step S5, frequency sweep is performed only in the B-phase piezoelectric elements. At this time, the switching control unit 18 controls the signal application unit 17, so that a signal is transmitted from the signal application unit 17 only to the B-phase piezoelectric elements. Furthermore, the switching control unit 18 controls the switch 13, so that the switch 13 is connected only to the electrodes of the A-phase piezoelectric elements. When the frequency sweep is performed in the B-phase piezoelectric elements, a feedback voltage from the A-phase piezoelectric elements is measured. An optimum frequency of a signal to be transmitted to the A-phase piezoelectric elements is thereby computed.

In step S6, the B-phase piezoelectric elements are excited and excitation of the A-phase piezoelectric elements is stopped. In step S6, as in step S5, the switching control unit 18 controls the signal application unit 17. More specifically, a signal is transmitted from the signal application unit 17 only to the B-phase piezoelectric elements. At this time, the signal application unit 17 selects the B-phase vibration condition from the A-phase and B-phase vibration conditions, and applies a signal to the B-phase electrodes of the B-phase piezoelectric elements.

In step S7, a feedback voltage of the A-phase piezoelectric elements is measured. In step S7, as in step S5, the switching control unit 18 controls the switch 13. More specifically, the switch 13 is connected only to the A-phase electrodes of the A-phase piezoelectric elements. It should be appreciated that only the A-phase electrodes are thereby connected to the amplitude detection unit 15.

In step S8, it is determined whether or not the lower feedback voltage, out of the feedback voltages of the A-phase piezoelectric elements and the B-phase piezoelectric elements, is equal to or higher than the target voltage. If the feedback voltage is equal to or higher than the target voltage, the process proceeds to step S9. On the other hand, if the feedback voltage is less than the target voltage, the process returns to step S2.

In step S9, a frequency of a signal to be applied to the piezoelectric elements of the stator 3 is calculated based on the target voltage. Specifically, an optimum frequency of a signal to be applied to the A-phase piezoelectric elements or the B-phase piezoelectric elements is calculated based on the relationship derived in step S2 or step S5, the amplitude of the vibrating body 4 detected by the amplitude detection unit 15, and the target voltage.

In step S10, a signal (e.g., a control signal) having the optimum frequency is then applied to the piezoelectric elements of the stator 3. Here, in step S10, the signal application unit 17 applies the signal to both the A-phase piezoelectric elements and the B-phase piezoelectric elements. Thus, the signal application unit 17 does not always selectively apply a signal. Note that the signal application unit 17 applies an A-phase signal to the A-phase electrodes of the A-phase piezoelectric elements, and applies a B-phase signal to the B-phase electrodes of the B-phase piezoelectric elements. After step S10 is performed, the process returns to step S2. At this time, the drive control device 2 repeats the operation as described above.

It is noted that an extra condition for returning from step S10 to step S2 may be provided according to the application of the ultrasonic motor element. Examples of the above condition can include a case where the ultrasonic motor element is rotated for a certain period of time and a case where an abnormality is sensed. Alternatively, examples of the above condition can also include a case where application of a signal is stopped after step S10 and a certain period of time has elapsed after the stop.

As described above, the drive control device 2 in the exemplary embodiment receives the feedback signal from the A-phase piezoelectric elements or the B-phase piezoelectric elements. The rotation of the ultrasonic motor element is thereby controlled. The need for a feedback piezoelectric element is thus eliminated. Downsizing of the ultrasonic motor element can therefore be achieved easily by not requiring such a feedback piezoelectric element. Furthermore, the feedback voltages of the piezoelectric elements polarized in a plurality of manners are respectively measured, so that an abnormality in the ultrasonic motor system 1, as a whole, can be detected. In addition, since each piezoelectric element is vibrated based on the measurement of the feedback voltage, the ultrasonic motor element can be stably controlled with respect to the contact pressure between the stator 3 and the rotor 8, the temperature of the ultrasonic motor element, and the like. Since each piezoelectric element can be efficiently vibrated, heat generation from each piezoelectric element can also be suppressed.

As in the present embodiment, the drive control device 2 preferably has the filter unit 14. More accurate feedback can thereby be performed. The filter unit 14 is more preferably a low-pass filter in an exemplary aspect. The filter unit 14 much more preferably has a pass band corresponding to a frequency band three times or less than the resonance frequency of the piezoelectric elements polarized in a plurality of manners. In these cases, noise can be sufficiently removed, and the relationship between the frequency and the feedback voltage can be sufficiently grasped. A significantly more accurate feedback can thus be performed.

Figure 7A:
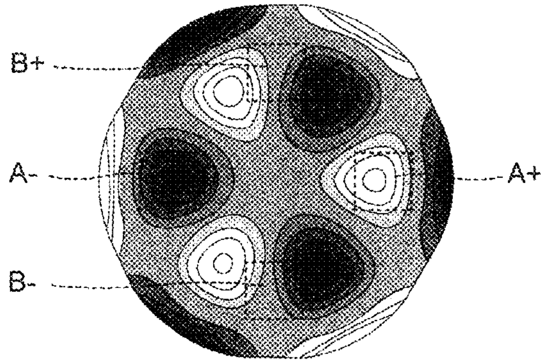
FIGS. 7(*a*) to 7(*c*) are schematic bottom views of the stator for easily describing a traveling wave.
Figure 7B:
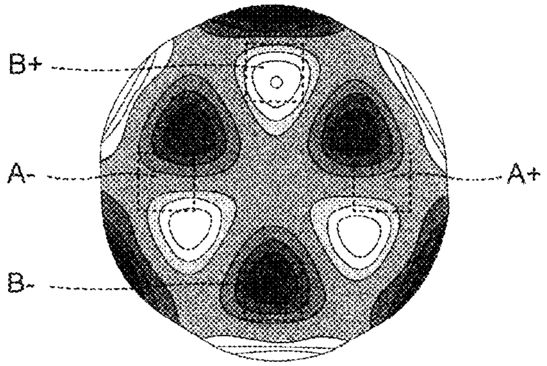
Figure 7C:
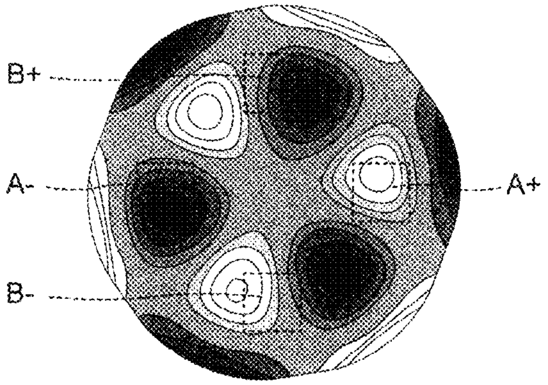

FIGS. 7(*a*) to 7(*c*) are schematic bottom views of the stator for easily describing the traveling wave. Note that FIGS. 7(*a*) to 7(*c*) show, in a gray scale, that the closer to black, the greater the stress in one direction, and the closer to white, the greater the stress in the other direction.

In the case of the present embodiment, in step S3, the A-phase piezoelectric elements are excited and excitation in the B-phase piezoelectric elements is stopped. At this time, a three-wave standing wave X as illustrated in FIG. 7(*a*) is generated. In step S6, on the other hand, the B-phase piezoelectric elements are excited and excitation in the A-phase piezoelectric elements is stopped. At this time, a three-wave standing wave Y as illustrated in FIG. 7(*b*) is generated. The three-wave standing wave X and the three-wave standing wave Y, which have a phase difference of 90°, are excited and combined to thereby generate a traveling wave illustrated in FIG. 7(*c*). Note that, although a three-wave example has been shown, the exemplary embodiment of the present invention is not limited thereto. Similarly, in a nine-wave case, two standing waves that have a phase difference of 90° are excited and combined to thereby generate a traveling wave. As described above, the traveling wave traveling at the vibrating body 4 in its circumferential direction is generated, so that the rotor 8 in contact with the second main surface 4*b* of the vibrating body 4 rotates about the center in the axial direction Z. it is also noted that in the exemplary invention, the configuration that generates a traveling wave is not limited to the configuration in the present embodiment, and a conventionally known various configurations that generate a traveling wave can be used.

The rotor body 8*a* may have a friction material fixed on its surface on the stator 3 side. The frictional force applied between the vibrating body 4 of the stator 3 and the rotor 8 can thereby be increased.

In the present embodiment, the center of the traveling wave coincides with the center of the stator 3 and the center of the vibrating body 4. However, the center of the traveling wave may not necessarily coincide with the center of the stator 3 or the center of the vibrating body 4.

In the exemplary aspect, the switch 13 has an A-phase connection portion 13*a*, a B-phase connection portion 13*c*, and a neutral portion 13*e* as shown in FIG. 2, for example. The A-phase connection portion 13*a* is electrically connected to the electrodes of the A-phase piezoelectric elements. The B-phase connection portion 13*c* is electrically connected to the electrodes of the B-phase piezoelectric elements. The neutral portion 13*e* is neither electrically connected to the A-phase piezoelectric elements nor to the B-phase piezoelectric elements. The switch 13 selects to connect to the A-phase connection portion 13*a* or to the B-phase connection portion 13*c* to thereby select an electrode of a piezoelectric element to connect. Here, the operation procedure of the drive control device 2 may include a step of keeping the switch 13 in a state of being connected to the neutral portion 13*e*. In this case, signal imbalance and the like in the ultrasonic motor system 1 can be suppressed.

In the present embodiment, the feedback signal of the A-phase piezoelectric elements is simultaneously selected by the switch 13. Furthermore, the same signal is simultaneously transmitted to each A-phase piezoelectric element by the signal application unit 17. The same applies to the B-phase piezoelectric elements. However, the exemplary embodiment of the present invention is not limited thereto, and each piezoelectric element may be independently selected by the switch 13 and the signal application unit 17. An example thereof will be shown below.

Figure 8:
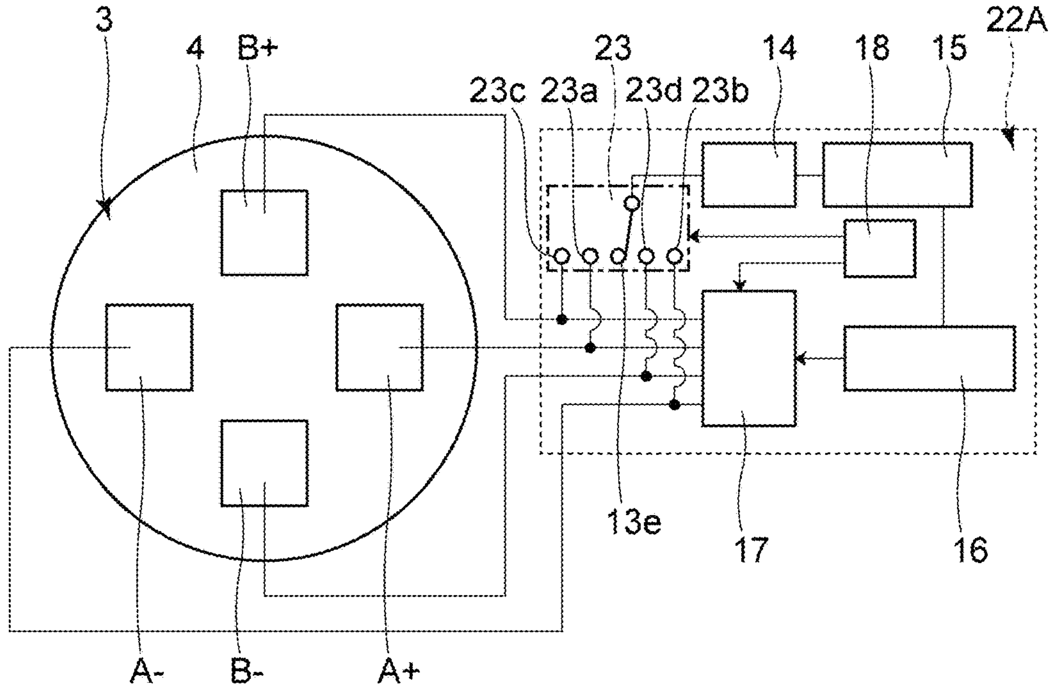
FIG. 8 is a schematic control circuit diagram of an ultrasonic motor system according to a first modification of the first exemplary embodiment.

FIG. 8 is a schematic control circuit diagram of an ultrasonic motor system according to a first modification of the first exemplary embodiment. It is noted that in FIG. 8, a piezoelectric element vibrating in an A phase + is indicated by a sign A +, and a piezoelectric element vibrating in an A phase − is indicated by a sign A −. A piezoelectric element vibrating in a B phase + is indicated by a sign B +, and a piezoelectric element vibrating in a B phase − is indicated by a sign B −. The same applies to the schematic control circuit diagrams of the drawings subsequent to FIG. 8.

In the present modification, a switch 23 in a drive control circuit 22A has a first A-phase connection portion 23*a*, a second A-phase connection portion 23*b*, a first B-phase connection portion 23*c*, a second B-phase connection portion 23*d*, and the neutral portion 13*e*. The first A-phase connection portion 23*a* is connected to an electrode of the piezoelectric element vibrating in the A phase +. The second A-phase connection portion 23*b* is connected to an electrode of the piezoelectric element vibrating in the A phase −. The first B-phase connection portion 23*c* is connected to an electrode of the piezoelectric element vibrating in the B phase +. The second B-phase connection portion 23*d* is connected to an electrode of the piezoelectric element vibrating in the B phase −. The switch 23 selects to connect to any of the above connection portions, under the control of the switching control unit 18, to thereby select a piezoelectric element to connect.

According to the exemplary aspect, the piezoelectric element vibrating in the A phase +, the piezoelectric element vibrating in the A phase −, the piezoelectric element vibrating in the B phase +, and the piezoelectric element vibrating in the B phase − are independently connected to the signal application unit 17. The signal application unit 17 selects a piezoelectric element to vibrate, among the piezoelectric elements polarized in a plurality of manners, under the control of the switching control unit 18.

Figure 9:
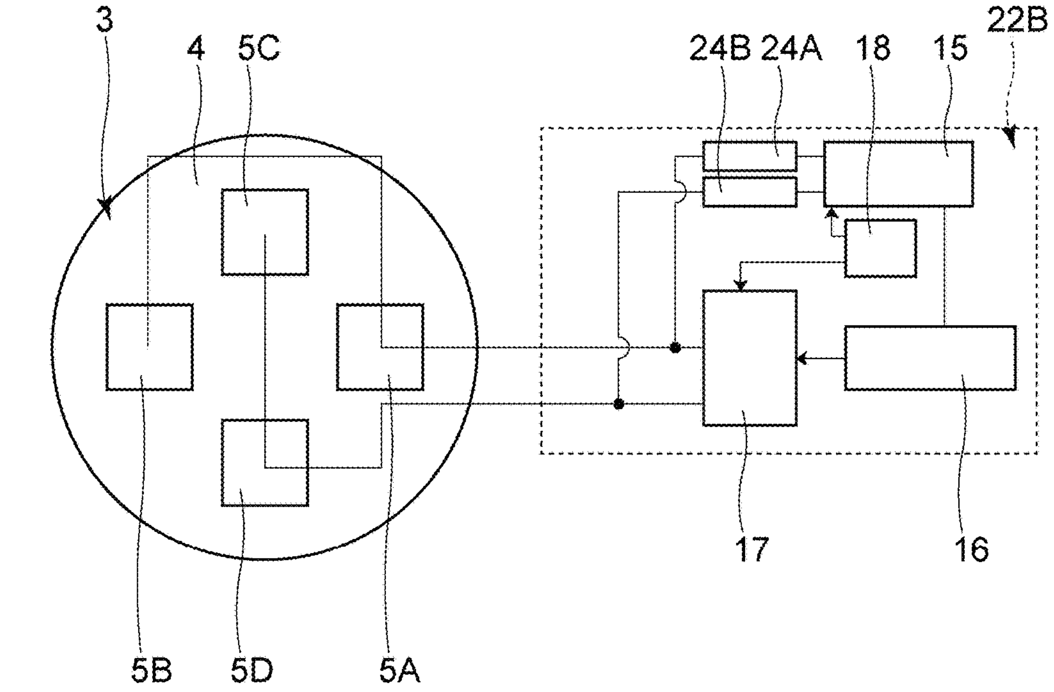
FIG. 9 is a schematic control circuit diagram of an ultrasonic motor system according to a second modification of the first exemplary embodiment.

FIG. 9 is a schematic control circuit diagram of an ultrasonic motor system according to a second modification of the first exemplary embodiment.

In the present modification, no switch is provided in a drive control circuit 22B. Instead, the drive control circuit 22B has a filter unit 24A and a filter unit 24B. The filter unit 24A has a pass band suitable for filtering a signal from the A-phase piezoelectric elements. The filter unit 24B has a pass band suitable for filtering a signal from the B-phase piezoelectric elements. Note that the filter units 24A and 24B may be integrally configured.

The switching control unit 18 instructs the amplitude detection unit 15 to control switching, so that the amplitude detection unit 15 itself switches the electrodes from which a feedback signal is received. This configuration reduces the number of component elements, reduce noise caused by the switch, and solves the problem of impedance mismatch between the A phase and the B phase. Without the switch, stability of the electrical connection between each electrode of the piezoelectric elements and the amplitude detection unit 15 can thus be enhanced, and loop stability can thus be improved.

In the present modification, for example, the electrodes of the piezoelectric elements are connected to an input/output terminal of a microcomputer including the amplitude detection unit 15. In the exemplary aspect, the microcomputer can include at least two of the filter units 24A and 24B, the amplitude detection unit 15, the signal condition control unit 16, the signal application unit 17, and the switching control unit 18 of the drive control circuit 22B. When the microcomputer includes the filter units 24A and 24B, the filter units 24A and 24B may be digital filters, for example. The microcomputer preferably includes all of the filter units 24A and 24B, the amplitude detection unit 15, the signal condition control unit 16, the signal application unit 17, and the switching control unit 18. In this case, the drive control circuit 22B, as a whole, can be a single microcomputer configured to execute instructions for performing the functions described herein. This configuration further reduces the number of components and further reduces noise.

Figure 10:
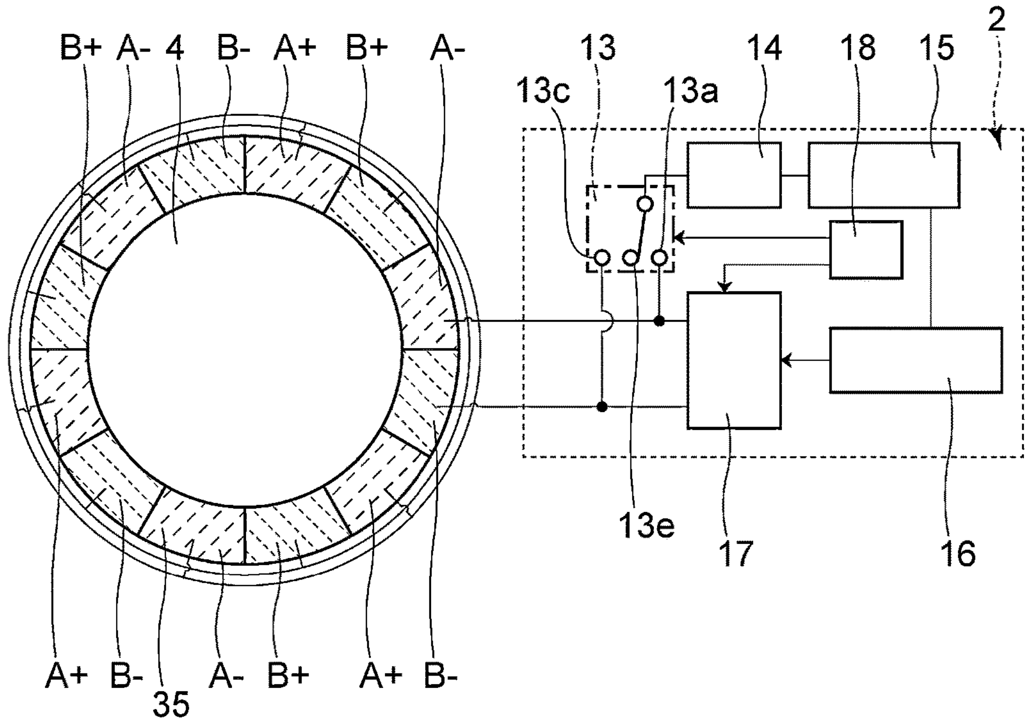
FIG. 10 is a schematic control circuit diagram of an ultrasonic motor system according to a second exemplary embodiment.

FIG. 10 is a schematic control circuit diagram of an ultrasonic motor system according to a second exemplary embodiment. In FIG. 10, the piezoelectric element is indicated by hatching. The same applies to FIG. 11.

The present embodiment is different from the first exemplary embodiment in the configuration of a piezoelectric element 35 connected to the drive control device 2. Except for the above, the ultrasonic motor system of the present embodiment has the configuration similar to that of the ultrasonic motor system 1 of the first exemplary embodiment.

According to the exemplary aspect, the piezoelectric element 35 is one piezoelectric element polarized in a plurality of manners. Hereinafter, details of the piezoelectric element 35 will be described. The piezoelectric element 35 has an annular shape with a plurality of regions. Moreover, the piezoelectric element 35 has different polarization directions for different regions. The piezoelectric element 35 thereby vibrates in mutually different phases in mutually different regions. The plurality of regions are arranged in the circumferential direction of the piezoelectric element 35. More specifically, the plurality of regions include a plurality of first A-phase regions, a plurality of second A-phase regions, a plurality of first B-phase regions, and a plurality of second B-phase regions. The piezoelectric element 35 vibrates in the A phase + in the first A-phase regions, and vibrates in the A phase − in the second A-phase regions. The piezoelectric element 35 vibrates in the B phase + in the first B-phase regions, and vibrates in the B phase − in the second B-phase regions.

As described above, the regions in the piezoelectric element 35 vibrate in mutually different phases. The piezoelectric element 35 includes three of each region described above. It is also noted that the piezoelectric element 35 is required to include at least one of each region described above.

The piezoelectric element 35 has a plurality of first electrodes. Each first electrode has an arc shape. The first electrodes provided in adjacent regions of the piezoelectric element 35 are not in contact with each other. Piezoelectric bodies of the piezoelectric element 35 of the present embodiment are polarized in mutually opposite directions in the first A-phase regions and the second A-phase regions. Similarly, piezoelectric bodies of the piezoelectric element 35 are polarized in mutually opposite directions in the first B-phase regions and the second B-phase regions. In other words, the piezoelectric element 35 is the piezoelectric element polarized in a plurality of manners.

The A-phase connection portion 13*a* of the switch 13 in the drive control device 2 is electrically connected to the electrodes of the plurality of first A-phase regions and the plurality of second A-phase regions. On the other hand, the B-phase connection portion 13*c* is electrically connected to the electrodes of the plurality of first B-phase regions and the plurality of second B-phase regions. The switch 13 thus selects to connect to the A-phase connection portion 13*a* or to the B-phase connection portion 13*c*, under the control of the switching control unit 18, to thereby select an electrode of a region to connect.

As further shown, the electrodes of the plurality of first A-phase regions and the plurality of second A-phase regions are commonly connected to the signal application unit 17. Similarly, the plurality of first B-phase regions and the plurality of second B-phase regions are commonly connected to the signal application unit 17. The signal application unit 17 is configured to select a piezoelectric element to vibrate, among the piezoelectric elements polarized in a plurality of manners, under the control of the switching control unit 18.

Also in the exemplary embodiment, the operation procedure of the drive control device 2 is similar to the flow illustrated in FIG. 5. The drive control device 2 receives a feedback signal from the first A-phase regions and the second A-phase regions or the first B-phase regions and the second B-phase regions, of the piezoelectric element 35. The rotation of the ultrasonic motor is thereby controlled. The need for a feedback piezoelectric element is thus eliminated. As in the first embodiment, downsizing of the ultrasonic motor element can therefore be achieved easily.

Figure 11:
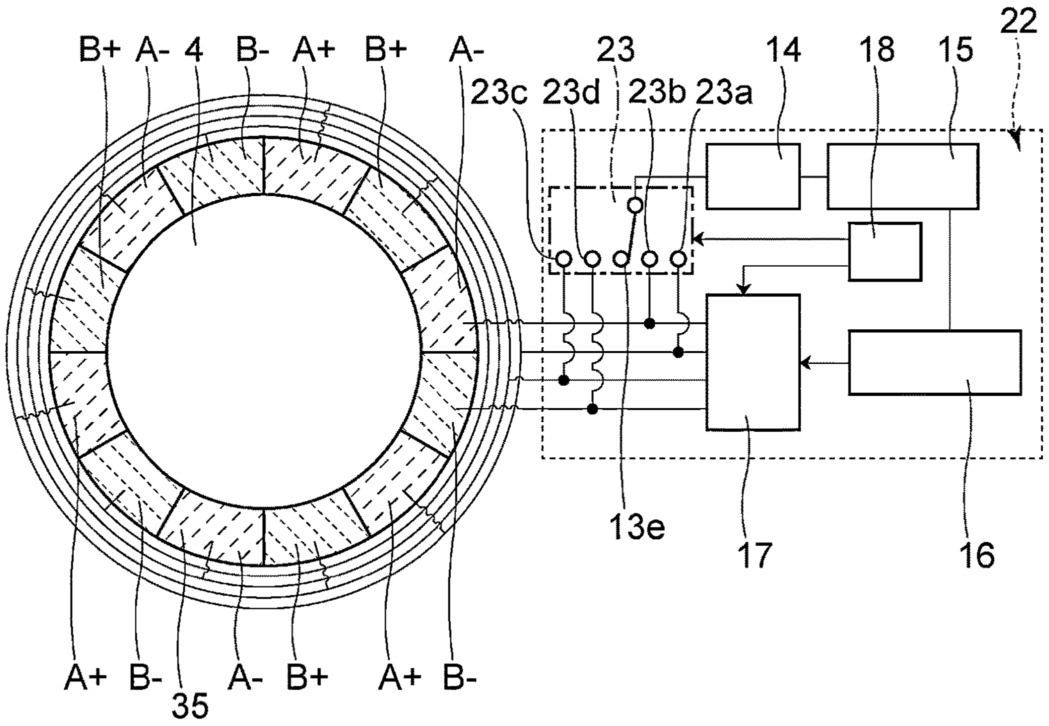
FIG. 11 is a schematic control circuit diagram of an ultrasonic motor system according to a modification of the second exemplary embodiment.

FIG. 11 is a schematic control circuit diagram of an ultrasonic motor system according to a modification of the second embodiment.

In the exemplary modification, the switch 23 has a configuration similar to that of the first modification of the first embodiment. The first A-phase connection portion 23*a* is connected to the electrodes of the first A-phase regions. The second A-phase connection portion 23*b* is connected to the electrodes of the second A-phase regions. The first B-phase connection portion 23*c* is connected to the electrodes of the first B-phase regions. The second B-phase connection portion 23*d* is connected the electrodes of the second B-phase regions. The switch 23 selects to connect to any of the above connection portions, under the control of the switching control unit 18, to thereby select an electrode of a region to connect, among the electrodes of the plurality of regions of the piezoelectric element 35.

The electrodes of the first A-phase regions, the second A-phase regions, the first B-phase regions, and the second B-phase regions are independently connected to the signal application unit 17. The signal application unit 17 selects regions to vibrate among the plurality of regions of the piezoelectric element 35, under the control of the switching control unit 18. The present modification, as in the second embodiment, can easily achieve downsizing of the ultrasonic motor element.

In an exemplary aspect, the drive control device according to the exemplary invention can also be used for an ultrasonic linear motor. An example thereof will be shown below.

Figure 12:
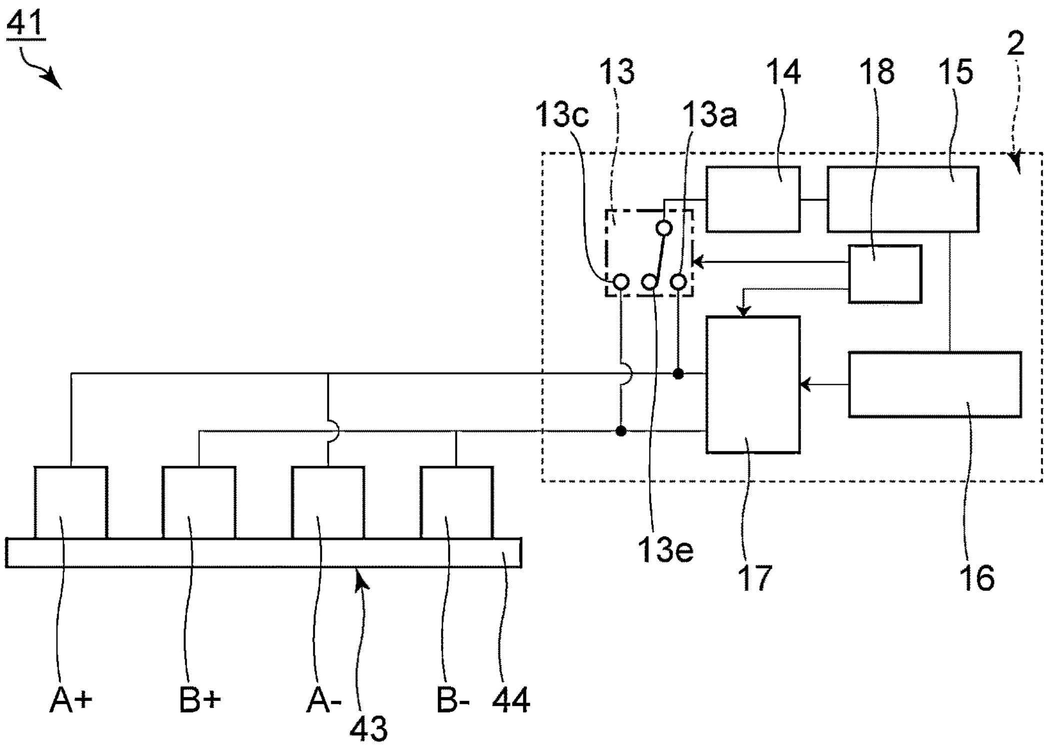
FIG. 12 is a schematic control circuit diagram of an ultrasonic motor system according to a third exemplary embodiment.

FIG. 12 is a schematic control circuit diagram of an ultrasonic motor system according to a third exemplary embodiment.

An ultrasonic motor element in an ultrasonic motor system 41 of the exemplary embodiment is an ultrasonic linear motor. The ultrasonic motor system 41 has a vibrator 43 that has a vibrating body 44 that has a rectangular parallelepiped shape. The vibrating body 44 has a plurality of piezoelectric elements provided thereon. More specifically, the vibrator 43 has two A-phase piezoelectric elements and two B-phase piezoelectric elements. Note that one of the A-phase piezoelectric elements vibrates in the A phase +, and the other of the A-phase piezoelectric elements vibrates in the A phase −. One of the B-phase piezoelectric elements vibrates in the B phase +, and the other of the B-phase piezoelectric elements vibrates in the B phase −.

In FIG. 12, the A-phase piezoelectric element vibrating in the A phase + is indicated by a sign A +, and the A-phase piezoelectric element vibrating in the A phase − is indicated by a sign A −. Furthermore, in FIG. 12, the B-phase piezoelectric element vibrating in the B phase + is indicated by a sign B +, and the B-phase piezoelectric element vibrating in the B phase − is indicated by a sign B −. The plurality of piezoelectric elements are arranged in the longitudinal direction of the vibrating body 44. The A-phase piezoelectric elements and the B-phase piezoelectric elements are alternately disposed. More specifically, the A-phase piezoelectric element vibrating in the A phase +, the B-phase piezoelectric element vibrating in the B phase +, the A-phase piezoelectric element vibrating in the A phase −, and the B-phase piezoelectric element vibrating in the B phase − are arranged in this order.

The ultrasonic motor system 41 has the drive control device 2 similar to that of the first exemplary embodiment as described above. The A-phase connection portion 13*a* of the switch 13 in the drive control device 2 is electrically connected to the electrodes of the plurality of A-phase piezoelectric elements. On the other hand, the B-phase connection portion 13*c* is electrically connected to the electrodes of the plurality of B-phase piezoelectric elements. The switch 13 thus selects to connect to the A-phase connection portion 13*a* or to the B-phase connection portion 13*c*, under the control of the switching control unit 18, to thereby select an electrode of a piezoelectric element to connect.

The electrodes of the plurality of A-phase piezoelectric elements are commonly connected to the signal application unit 17. Similarly, the electrodes of the plurality of B-phase piezoelectric elements are commonly connected to the signal application unit 17. The signal application unit 17 selects a piezoelectric element to vibrate among the plurality of piezoelectric elements, under the control of the switching control unit 18.

Also in the present embodiment, the operation procedure of the drive control device 2 is similar to the flow illustrated in FIG. 5. The drive control device 2 receives a feedback signal from the A-phase piezoelectric elements or the B-phase piezoelectric elements. The rotation of the ultrasonic motor is thereby controlled. The need for a feedback piezoelectric element and an electrode thereof is thus eliminated. As in the first embodiment, downsizing of the ultrasonic motor element can therefore be achieved easily.

Figure 13:
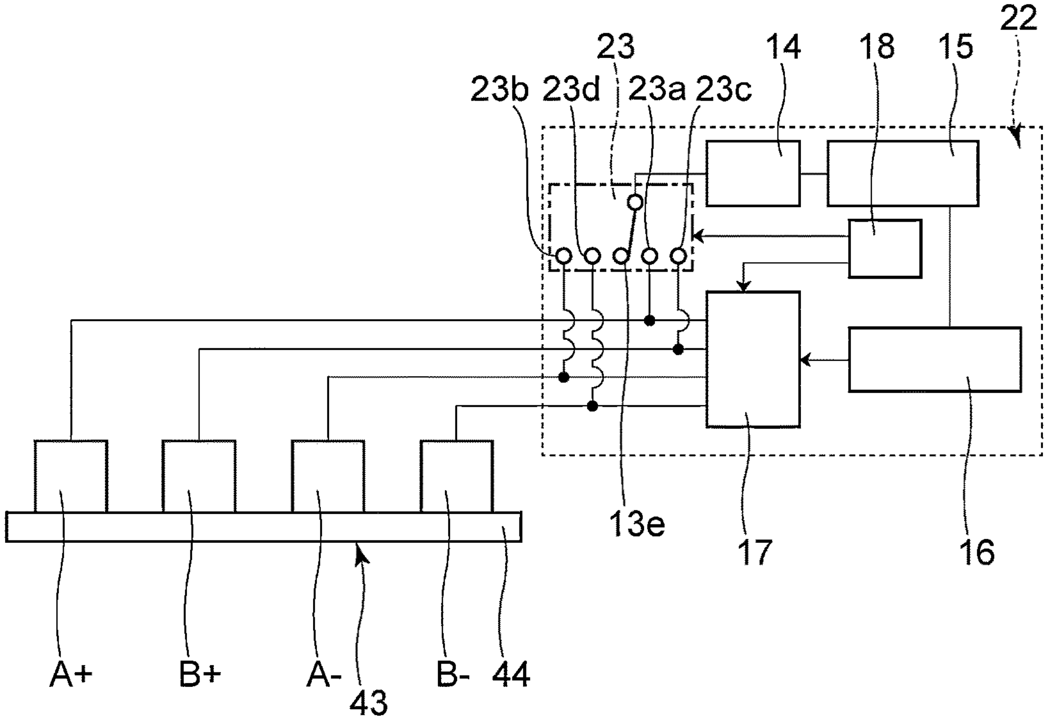
FIG. 13 is a schematic control circuit diagram of an ultrasonic motor system according to a modification of the third exemplary embodiment.

FIG. 13 is a schematic control circuit diagram of an ultrasonic motor system according to a modification of the third exemplary embodiment.

In the present modification, the switch 23 has a configuration similar to that of the first modification of the first embodiment. The first A-phase connection portion 23*a* is connected to the electrode of the A-phase piezoelectric element vibrating in the A phase +. The second A-phase connection portion 23*b* is connected to the electrode of the A-phase piezoelectric element vibrating in the A phase −. The first B-phase connection portion 23*c* is connected to the electrode of the B-phase piezoelectric element vibrating in the B phase +. The second B-phase connection portion 23*d* is connected to the electrode of the B-phase piezoelectric element vibrating in the B phase −. The switch 23 selects to connect to any of the above connection portions, under the control of the switching control unit 18, to thereby select an electrode of a piezoelectric element to connect.

In this exemplary aspect, the electrodes of the piezoelectric elements are independently connected to the signal application unit 17. The signal application unit 17 selects a piezoelectric element to vibrate under the control of the switching control unit 18. The present modification, as in the third embodiment, can easily achieve downsizing of the ultrasonic motor element.

In general, it is noted that the exemplary embodiments described above are intended to facilitate the understanding of the present invention, and are not intended to limit the interpretation of the present invention. The present invention may be modified and/or improved without departing from the spirit and scope thereof, and equivalents thereof are also included in the present invention. That is, exemplary embodiments obtained by those skilled in the art applying design change as appropriate on the embodiments are also included in the scope of the present invention as long as the obtained embodiments have the features of the present invention. For example, each of the elements included in each of the embodiments, and arrangement, materials, conditions, shapes, sizes, and the like thereof are not limited to those exemplified above, and may be modified as appropriate. It is to be understood that the exemplary embodiments are merely illustrative, partial substitutions or combinations of the configurations described in the different embodiments are possible to be made, and configurations obtained by such substitutions or combinations are also included in the scope of the present invention as long as they have the features of the present invention.

DESCRIPTION OF REFERENCE SYMBOLS

1: Ultrasonic motor system
2: Drive control device
3: Stator
4: Vibrating body
4*a*, 4*b*: First and second main surfaces
5A to 5D: First to fourth piezoelectric elements
6: Piezoelectric body
6*a*, 6*b*: Third and fourth main surfaces
7A, 7B: First and second electrodes
8: Rotor
8*a*: Rotor body
8*b*: Rotating shaft
13: Switch
13*a*: A-phase connection portion
13*c*: B-phase connection portion
13*e*: Neutral portion
14: Filter unit
15: Amplitude detection unit (feedback signal reception unit)
16: Signal condition control unit
17: Signal application unit
18: Switching control unit
22A, 22B: Drive control circuit
23: Switch
23*a*, 23*b*: First and second A-phase connection portions
23*c*, 23*d*: First and second B-phase connection portions
24A, 24B: Filter unit
35: Piezoelectric element
41: Ultrasonic motor system
43: Vibrator
44: Vibrating body

The invention claimed is:

1. A drive control device that applies signals having mutually different phases to a plurality of electrodes disposed on a piezoelectric element on a vibrating body, the drive control device comprising:

a signal application unit configured to selectively apply a signal to an electrode of the plurality of electrodes;

a feedback signal reception unit configured to receive a feedback signal from an electrode different from the electrode to which the signal application unit has selectively applied the signal; and a signal condition control unit configured to receive and use the feedback signal to control a condition of a control signal to be applied by the signal application unit to control vibration of the vibrating body, wherein the signal application unit is further configured to apply the signal to the plurality of electrodes to include an A-phase signal and a B-phase signal, and the plurality of electrodes include an A-phase electrode to which the A-phase signal is applied and a B-phase electrode to which the B-phase signal is applied.

2. The drive control device according to claim 1, wherein, when the signal application unit applies the B-phase signal to the B-phase electrode and applies no signal to the A-phase electrode, the feedback signal reception unit receives the feedback signal from the A-phase electrode.

3. The drive control device according to claim 2, further comprising a pair of filter units including a first filter unit having a pass band configured for filtering a signal from the A-phase electrode and a second filter unit having a pass band configured for filtering a signal from the B-phase electrode.

4. The drive control device according to claim 1, further comprising a filter unit that is connected between the plurality of electrodes and the feedback signal reception unit and that is configured to filter the feedback signal.

5. The drive control device according to claim 4, wherein the filter unit comprises a pass band that corresponds to a frequency band three times or less than a resonance frequency of the piezoelectric element.

6. The drive control device according to claim 1, further comprising a switching control unit configured to instruct the feedback signal reception unit to switch connection such that the feedback signal reception unit is connected to an electrode different from the electrode to which the signal application unit has selectively applied the signal.

7. The drive control device according to claim 1, further comprising a switch configured to switch connection such that the feedback signal reception unit is connected to an electrode different from the electrode to which the signal application unit has selectively applied the signal.

8. The drive control device according to claim 1, wherein the signal application unit and the feedback signal reception unit are collectively configured to repeat an operation that includes measuring a voltage of the feedback signal, determining whether the measured voltage is equal to or higher than a target voltage, setting a vibration condition of the piezoelectric element, and applying the control signal to the piezoelectric element.

9. The drive control device according to claim 8, wherein the target voltage is determined according to a required displacement of the vibrating body.

10. The drive control device according to claim 1, wherein the signal condition control unit configured to determine an optimum frequency as the condition of the control signal to control vibration of the vibrating body.

11. The drive control device according to claim 1, wherein the piezoelectric element comprises a plurality of regions having different polarization directions.

12. The drive control device according to claim 1, further comprising a microcomputer including memory and a processor configured to implement instructions on the memory so as to provide the signal application unit, the feedback signal reception unit, and the signal condition control unit.

13. An ultrasonic motor system comprising:

the drive control device according to claim 1;

the vibrating body; and the plurality of electrodes disposed on the piezoelectric element on the vibrating body, wherein the ultrasonic motor system comprises no feedback electrode.

14. The ultrasonic motor system according to claim 13, further comprising a rotor in contact with the vibrating body, with the vibrating body having a disk shape.

15. An ultrasonic motor system comprising:

a vibrating body having a piezoelectric element;

a plurality of electrodes disposed on the piezoelectric element; and a drive control device that includes at least one microcomputer configured to provide:

a signal application unit configured to selectively apply a signal to an electrode of the plurality of electrodes;

a feedback signal reception unit configured to receive a feedback signal from an electrode that different from the electrode to which the signal application unit has selectively applied the signal; and a signal condition control unit configured to receive and use the feedback signal to control a condition of a control signal to be applied to control a vibration of the vibrating body, wherein the ultrasonic motor system comprises no feedback electrode.

16. The ultrasonic motor system according to claim 15, further comprising a rotor in contact with the vibrating body, with the vibrating body having a disk shape.

17. The ultrasonic motor system according to claim 15, wherein the at least one microcomputer includes a memory and a processor configured to implement instructions on the memory so as to provide the signal application unit, the feedback signal reception unit, and the signal condition control unit.

18. The ultrasonic motor system according to claim 15, wherein:

the signal application unit is further configured to apply the signal to the plurality of electrodes to include an A-phase signal and a B-phase signal, the plurality of electrodes include an A-phase electrode to which the A-phase signal is applied and a B-phase electrode to which the B-phase signal is applied and wherein, when the signal application unit applies the B-phase signal to the B-phase electrode and applies no signal to the A-phase electrode, the feedback signal reception unit receives the feedback signal from the A-phase electrode.

* * * * *